(12) United States Patent
Hadad

(10) Patent No.: US 7,440,508 B2
(45) Date of Patent: *Oct. 21, 2008

(54) SYSTEM AND METHOD FOR CELLULAR COMMUNICATIONS

(76) Inventor: Zion Hadad, 48 Haaloglm St., Rishon Lezion (IL)

( * ) Notice: Subject to any disclaimer, the term of this patent is extended or adjusted under 35 U.S.C. 154(b) by 0 days.

This patent is subject to a terminal disclaimer.

(21) Appl. No.: 11/286,323

(22) Filed: Nov. 25, 2005

(65) Prior Publication Data
US 2006/0072678 A1 Apr. 6, 2006

(51) Int. Cl.
H04K 1/10 (2006.01)
H04L 27/28 (2006.01)

(52) U.S. Cl. .......... 375/260; 375/148; 375/222; 375/254; 370/335; 455/501

(58) Field of Classification Search ........ 375/260, 375/222, 219, 148, 254; 370/335; 455/501
See application file for complete search history.

(56) References Cited

U.S. PATENT DOCUMENTS 6,005,893 A * 12/1999 Hyll .................. 375/260
6,351,473 B1 * 2/2002 Reusens et al. ......... 370/480
6,400,773 B1 * 6/2002 Krongold et al. ........ 375/260

* cited by examiner

Primary Examiner—Ted Wang
(74) Attorney, Agent, or Firm—Smith Frohwein Tempel Greenlee Blaha, LLC; Gregory Scott Smith

(57) ABSTRACT

A a system for allocating subcarriers to subscribers, comprising a subcarriers allocation controller, connected to a subcarrier modulation unit in a transmitter and to a subcarrier demodulation unit in a receiver for setting a group of subcarriers to be used therein. The transmitter and the receiver are part of the transceiver and subcarriers allocation is made according to a Reed-Solomon code. In a multicarrier system, a method for allocating subcarriers to subscribers, comprising: A. keep a table of R-S codes for frequency group allocation to base stations; B. assign one set of subcarriers based on R-S codes to a base station; C. assign other sets of subcarriers based on R-S codes to other base stations in such a way that adjacent base stations have different R-S codes.

11 Claims, 7 Drawing Sheets

|    | 0  | 1  | 2  | 3  | 4  | 5  | 6  | 7  | 8  | 9  | 10 | 11 | 12 | 13 | 14 | 15 | 16 | 17 | 18 | 19 | 20 | 21 | 22 |
|----|----|----|----|----|----|----|----|----|----|----|----|----|----|----|----|----|----|----|----|----|----|----|----|
| 0  | 0  | 5  | 2  | 10 | 4  | 20 | 8  | 17 | 16 | 11 | 9  | 22 | 18 | 21 | 13 | 19 | 3  | 15 | 6  | 7  | 12 | 14 | 1  |
| 1  | 1  | 6  | 3  | 11 | 5  | 21 | 9  | 18 | 17 | 12 | 10 | 0  | 19 | 22 | 14 | 20 | 4  | 16 | 7  | 8  | 13 | 15 | 2  |
| 2  | 2  | 7  | 4  | 12 | 6  | 22 | 10 | 19 | 18 | 13 | 11 | 1  | 20 | 0  | 15 | 21 | 5  | 17 | 8  | 9  | 14 | 16 | 3  |
| 3  | 3  | 8  | 5  | 13 | 7  | 0  | 11 | 20 | 19 | 14 | 12 | 2  | 21 | 1  | 16 | 22 | 6  | 18 | 9  | 10 | 15 | 17 | 4  |
| 4  | 4  | 9  | 6  | 14 | 8  | 1  | 12 | 21 | 20 | 15 | 13 | 3  | 22 | 2  | 17 | 0  | 7  | 19 | 10 | 11 | 16 | 18 | 5  |
| 5  | 5  | 10 | 7  | 15 | 9  | 2  | 13 | 22 | 21 | 16 | 14 | 4  | 0  | 3  | 18 | 1  | 8  | 20 | 11 | 12 | 17 | 19 | 6  |
| 6  | 6  | 11 | 8  | 16 | 10 | 3  | 14 | 0  | 22 | 17 | 15 | 5  | 1  | 4  | 19 | 2  | 9  | 21 | 12 | 13 | 18 | 20 | 7  |
| 7  | 7  | 12 | 9  | 17 | 11 | 4  | 15 | 1  | 0  | 18 | 16 | 6  | 2  | 5  | 20 | 3  | 10 | 22 | 13 | 14 | 19 | 21 | 8  |
| 8  | 8  | 13 | 10 | 18 | 12 | 5  | 16 | 2  | 1  | 19 | 17 | 7  | 3  | 6  | 21 | 4  | 11 | 0  | 14 | 15 | 20 | 22 | 9  |
| 9  | 9  | 14 | 11 | 19 | 13 | 6  | 17 | 3  | 2  | 20 | 18 | 8  | 4  | 7  | 22 | 5  | 12 | 1  | 15 | 16 | 21 | 0  | 10 |
| 10 | 10 | 15 | 12 | 20 | 14 | 7  | 18 | 4  | 3  | 21 | 19 | 9  | 5  | 8  | 0  | 6  | 13 | 2  | 16 | 17 | 22 | 1  | 11 |
| 11 | 11 | 16 | 13 | 21 | 15 | 8  | 19 | 5  | 4  | 22 | 20 | 10 | 6  | 9  | 1  | 7  | 14 | 3  | 17 | 18 | 0  | 2  | 12 |
| 12 | 12 | 17 | 14 | 22 | 16 | 9  | 20 | 6  | 5  | 0  | 21 | 11 | 7  | 10 | 2  | 8  | 15 | 4  | 18 | 19 | 1  | 3  | 13 |
| 13 | 13 | 18 | 15 | 0  | 17 | 10 | 21 | 7  | 6  | 1  | 22 | 12 | 8  | 11 | 3  | 9  | 16 | 5  | 19 | 20 | 2  | 4  | 14 |
| 14 | 14 | 19 | 16 | 1  | 18 | 11 | 22 | 8  | 7  | 2  | 0  | 13 | 9  | 12 | 4  | 10 | 17 | 6  | 20 | 21 | 3  | 5  | 15 |
| 15 | 15 | 20 | 17 | 2  | 19 | 12 | 0  | 9  | 8  | 3  | 1  | 14 | 10 | 13 | 5  | 11 | 18 | 7  | 21 | 22 | 4  | 6  | 16 |
| 16 | 16 | 21 | 18 | 3  | 20 | 13 | 1  | 10 | 9  | 4  | 2  | 15 | 11 | 14 | 6  | 12 | 19 | 8  | 22 | 0  | 5  | 7  | 17 |
| 17 | 17 | 22 | 19 | 4  | 21 | 14 | 2  | 11 | 10 | 5  | 3  | 16 | 12 | 15 | 7  | 13 | 20 | 9  | 0  | 1  | 6  | 8  | 18 |
| 18 | 18 | 0  | 20 | 5  | 22 | 15 | 3  | 12 | 11 | 6  | 4  | 17 | 13 | 16 | 8  | 14 | 21 | 10 | 1  | 2  | 7  | 9  | 19 |
| 19 | 19 | 1  | 21 | 6  | 0  | 16 | 4  | 13 | 12 | 7  | 5  | 18 | 14 | 17 | 9  | 15 | 22 | 11 | 2  | 3  | 8  | 10 | 20 |
| 20 | 20 | 2  | 22 | 7  | 1  | 17 | 5  | 14 | 13 | 8  | 6  | 19 | 15 | 18 | 10 | 16 | 0  | 12 | 3  | 4  | 9  | 11 | 21 |
| 21 | 21 | 3  | 0  | 8  | 2  | 18 | 6  | 15 | 14 | 9  | 7  | 20 | 16 | 19 | 11 | 17 | 1  | 13 | 4  | 5  | 10 | 12 | 22 |
| 22 | 22 | 4  | 1  | 9  | 3  | 19 | 7  | 16 | 15 | 10 | 8  | 21 | 17 | 20 | 12 | 18 | 2  | 14 | 5  | 6  | 11 | 13 | 0  |

Fig. 3

SYSTEM AND METHOD FOR CELLULAR COMMUNICATIONS

CROSS-REFERENCE TO RELATED APPLICATIONS

The present application claims priority from the U.S. patent application Ser. No. 09/624,236 filed on Jul. 24, 2000 and titled:

System and method for cellular communications.

FIELD OF THE INVENTION

The present invention relates to cellular and xDSL communication systems. More particularly, the invention relates to methods and systems for allocating subcarriers to subscribers in such a manner as to reduce the interference between users in the same cell and in adjacent cells or sectors.

BACKGROUND OF THE INVENTION

At present, a cellular system may use a multicarrier system. Such systems are known in the art, and may comply with the DVB-T standards in Europe, or MMDS (Multichannel Multipoint Distribution Service) in U.S.A. These systems use the Orthogonal Frequency Division Multiplexing (OFDM) method, wherein symbols are transmitted in parallel by modulating a large number of orthogonal subcarriers.

A base station may be allocated, for example, 1700 out of 2000 subcarriers. The subcarriers may span a given frequency range, while being equidistantly located in the frequency domain.

The problem is how to allocate the various subcarriers to subscribers so as to minimize interference between users.

To illustrate such a problem: a base station is allocated, for example, a frequency range comprising 1600 subcarriers, divided into 64 groups of 25 subcarriers each.

A first user is allocated a spectrum comprising a plurality of subcarriers, one in each of the 64 groups.

A second user is allocated a spectrum comprising a plurality of subcarriers, a different one in each of the 64 groups.

Preferably, all the subcarriers allocated to the second user are different than those allocated to the first user.

Additional users are allocated other subcarriers.

One problem in the abovedetailed scheme is a possible collision between users, when two users are allocated the same subcarrier.

Such collisions are undesirable, as they may generate errors in communication, which may possibly increase the Bit Error Rate (BER) or slow down the communication channel.

Collisions may even occur if users are allocated different subcarriers. Thus, if there is a frequency deviation in the transmission of a first user and there are some subcarriers of that user which are close in frequency to some subcarriers of another user, then collisions may occur.

A collision occurs as the spectrum of that first user slides in frequency, to partially overlap with the spectrum of the second user.

Such frequency deviations may occur, for example, when one of the users is in motion, because of the Doppler effect.

The need for the use of smart subcarrier allocation may come from the frequency deviation that a user can suffer and its effect on other users. Allocating to users with all of their carriers allocated one adjunct to the other can cause, in a frequency deviation scenario a destruction of the deviated user and the adjunct one.

As the number of colliding subcarriers increases, the undesired disruption is more detrimental to communications.

Therefore, there is a problem of subcarriers allocation to users so as to reduce this undesirable effect.

The problem is further complicated in a multiuser cellular system, where there is a plurality of users communicating to a base station.

Each user is allocated a plurality of subcarriers, some of which may possibly be close in frequency to other user's subcarriers.

This is a complex, multidimensional problem that may be difficult to solve.

The above description relates to communications between one base station and users in that cell.

In real life, the problem is further aggravated because of interference between adjacent cells. Thus, a base station in one cell may receive interfering signals (subcarriers) from users in a nearby cell.

It is an objective of the present invention to address the problems of the allocation of subcarriers in a multicarrier cellular system.

SUMMARY OF THE INVENTION

According to the present invention, there is provided a system and method for allocating subcarriers to users in a multicarrier cellular communication system and xDSL systems. It includes the use of special permutation series for carrier allocation.

According to one aspect of the invention, the subcarriers in each cell are allocated according to a Reed-Solomon (R-S) sequence. Each user in that cell is assigned a cyclic shifted version of a specific RS code sequence. This allocation decreases the number of subcarriers which are close to each other, for the various users in that cell.

Two users may use a maximum of one case where two subcarriers are adjacent to each other.

Thus, a method and system for allocating subcarriers in a cell is disclosed.

According to another aspect of the invention, users in adjacent cells are allocated different R-S codes, or the same code where we are adding one to the index of each code.

This approach may be used to minimize interference in one base station from users in another cell.

The use of R-S codes to frequency hopping in FH-CDMA is known in the art, as are known the low crosscorrelation properties of these codes. Until now, however, R-S codes have not been used for a group of subcarriers allocation in multi-carriers systems.

According to yet another aspect of the invention, a distinction is made between the various users as to their interfering potential to a nearby cell, according to their distance from their own base station and their sectorial location.

An improved subcarrier allocation method that takes these effects into account is disclosed.

The present innovation may thus improve the reuse factor as well.

Thus, the invention relates to improvements in cellular and xDSL communication systems. These improvements include methods and systems for allocating subcarriers to subscribers in such a manner as to reduce the interference between users in the same cell and in adjacent cells or sectors.

Furthermore, the novel system and method will reduce the phase noise and interference due to the Doppler effect to neighbor users who have been allocated other subcarriers.

Further objects, advantages and other features of the present invention will become obvious to those skilled in the art upon reading the disclosure set forth hereinafter.

BRIEF DESCRIPTION OF THE DRAWINGS

The invention will now be described by way of example and with reference to the accompanying drawings in which:

FIG. 3 details a basic Reed-Solomon sequence of base 23 usable in subcarriers allocation.

DETAILED DESCRIPTION OF THE PREFERRED EMBODIMENTS

A preferred embodiment of the present invention will now be described by way of example and with reference to the accompanying drawings.

Figure 1:
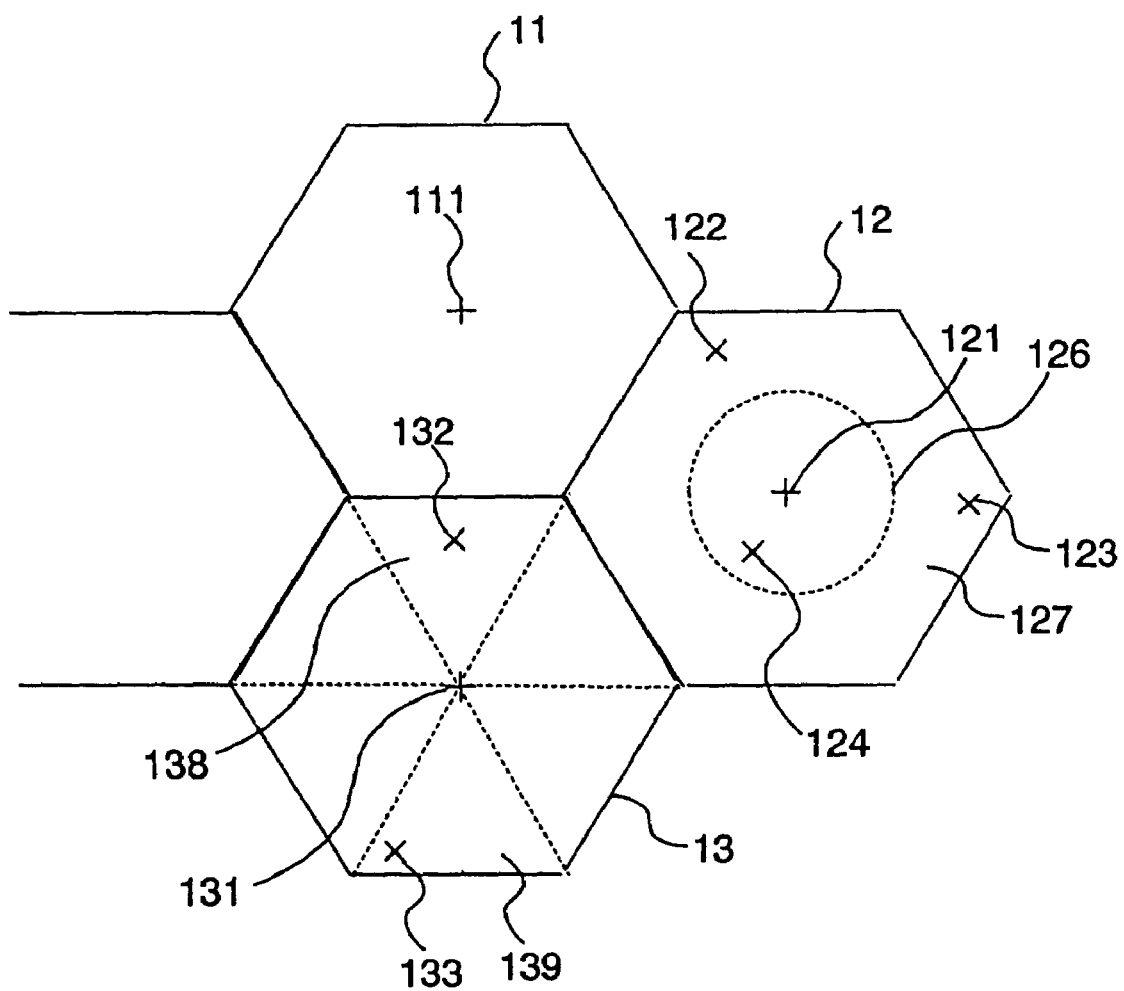
FIG. 1 illustrates a cellular wireless system.

FIG. 1 illustrates a cellular wireless system with a plurality of wireless cells 11, 12 and 13 as illustrated, and a corresponding base station 111, 121, 131 in each cell.

In each cell there may be, at any given moment, a plurality of subscribers like the mobile subscribers 122, 123 and 124 in cell 12.

According to the present invention, there is made a distinction between subscribers close to a base station and subscribers closer to the periphery of a cell. The illustrated inner circle 126 separates between close subscribers like subscriber 124 which is located within circle 126, and more distant subscribers like 122 and 123 which are located within the outer ring 127.

The close subscribers transmit at a lower power, since they are close to the base station and need not transmit a high power. Therefore, close subscribers will interfere less with another base station, than distant subscribers. For example, subscriber 122 which is more distant from base 121, will interfere more with base 111 than the closely located subscriber 124.

Accordingly, a distant subscriber like subscribers 122 and 123 may be assigned different codes than close subscribers, to achieve a better separation from the codes used in adjacent cells.

A method for achieving better separation between users in a cellular system, using this effect, is further detailed with reference to FIGS. 5 and 6.

The above system and method may achieve less interference between users in the cellular system, thus increasing the number of users who may be concurrently serviced in the system.

Where directional information is available in the base station, it is possible to further reduce interference between users and base stations.

The novel system and method uses a novel approach of directional code assignment, which is based on the discovery that subscribers in different sectors cause a different amount of interference to adjacent base stations.

For example, there is definitely a different amount of interference to base station 111 from subscribers in sectors 138 and 139 in cell 13.

A mobile subscriber 132 in sector 138 will cause a strong interference, whereas a mobile subscriber 133 will cause a weaker interference.

The reason is wave propagation phenomena, wherein the intensity of the radio waves decreases as the fourth power of range, for transmitters and receivers close to ground.

Therefore, base station 131 may allocate different codes to subscribers in cell 13, taking into account possible interference to adjacent cells.

Subscriber 132 will be assigned a code that is more farther away from that in base station 111, to counter the stronger interference caused by that subscriber, because of its closer distance.

Subscriber 133, however, may be assigned a code that is closer to the codes in base 111, since the much larger distance (about 2 to 3 times larger) will cause a decrease of 14 to 27 times in the power of interference to that base station.

Base station 131 is illustrated as having six sectors. A different number of sectors may be used. In any case, there is information available in the base station regarding the direction of each subscriber.

According to the invention, this information is used to allocate subcarriers to each subscriber, so as to minimize the interference between the subscribers and the base stations in the cellular system.

Such a smart subcarrier allocation will decrease interference in the system and will thus allow more users to operate in the allocated frequency band.

Figure 2:
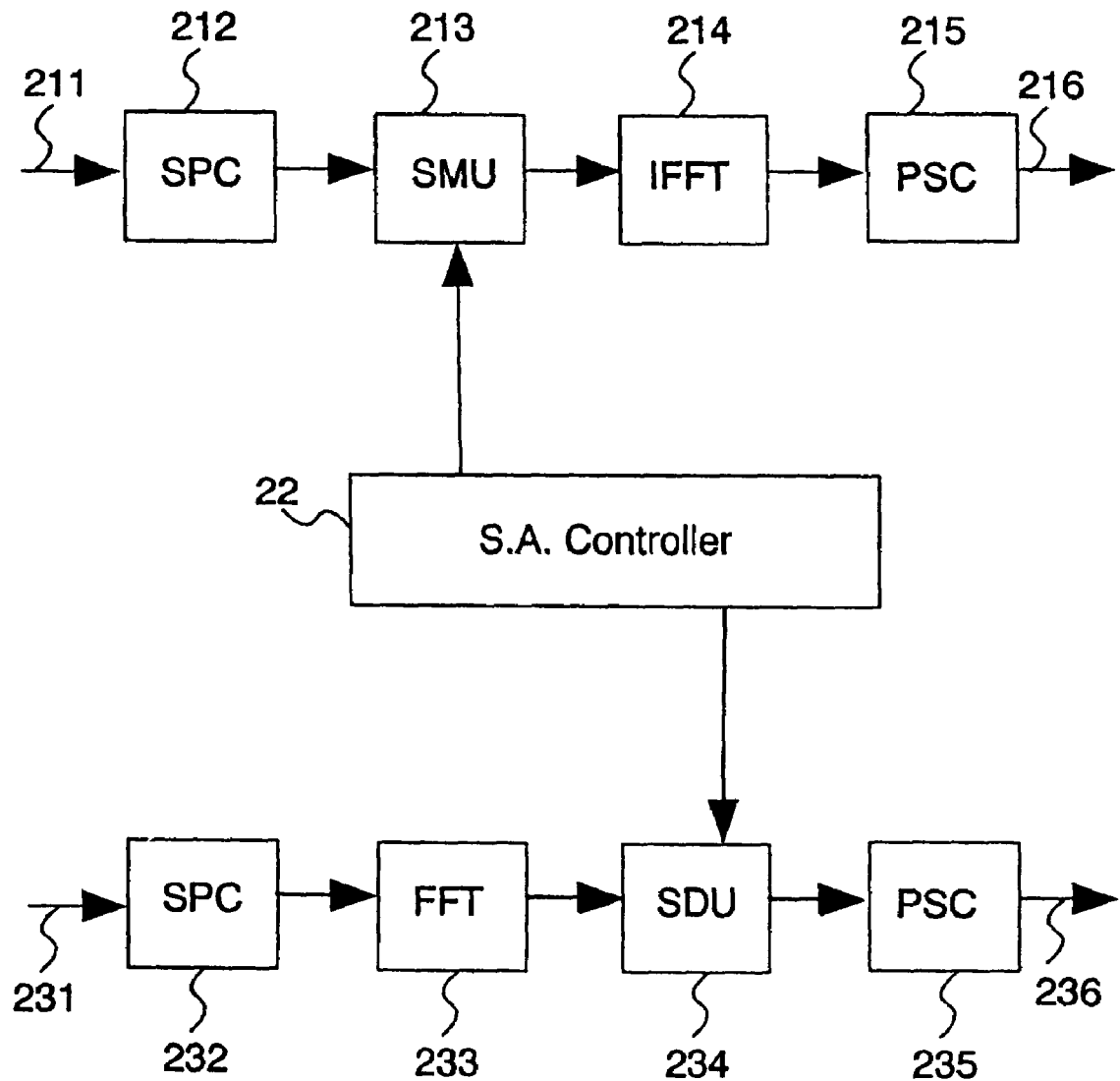
FIG. 2 details a cellular transmitter/receiver including subcarriers allocation means.

FIG. 2 details a cellular transmitter/receiver including subcarriers allocation means. The system may be used in a cellular multicarrier system, wherein subcarrier groups are allocated to each transmitter/receiver according to the methods detailed in the present disclosure.

The transmitter may include a transmit data in (serial) 211 being applied to a serial to parallel converter 212, which convert the data to parallel words. A subcarrier modulation unit 213 modulates the subcarriers allocated to the transmitter responsive to the data in 211.

A subcarriers allocation controller 22 allocates the subcarriers to be used in unit 213, out of the set of allocated subcarriers for that base station.

The Inverse Fast Fourier Transform (IFFT) unit 214 transforms the modulated subcarriers into the time domain, for transmission.

The IFFT unit is just one embodiment of a multicarrier modulation unit; other implementations of the unit are possible as well.

Since the time samples are concurrently being output out of unit 214, a parallel to serial converter 215 is used to transform the samples to serial form for transmission. The resulting signal is output as the transmit data out (serial) 216.

The receiver may include a receive data in (serial) 231 being applied to a serial to parallel converter 232, for the subsequent signal processing.

A Fast Fourier Transform (FFT) unit 233 converts the received signals into the frequency domain. A subcarrier demodulation unit 234 uses information regarding subcarriers in the received signal received from the subcarriers allocation controller 22 to demodulate the received signal.

A parallel to serial converter 235 reconstructs the received signal in the time domain, this being the receive data out (serial) 236.

FIG. 3 details a basic Reed-Solomon (R-S) code 23 based, usable in subcarriers allocation.

These codes have the maximal distance between shifted versions thereof, and accordingly are advantageously used in the present invention in a multicarrier cellular system to minimize collisions between subcarriers. There are 23 cyclic rotations, from user to user.

Each row in the table corresponds to one cell or sector. Thus, for example, the first row may correspond to Cell 233/sector #1, the second row may correspond to Cell 233/sector #2, etc.

Figure 4:
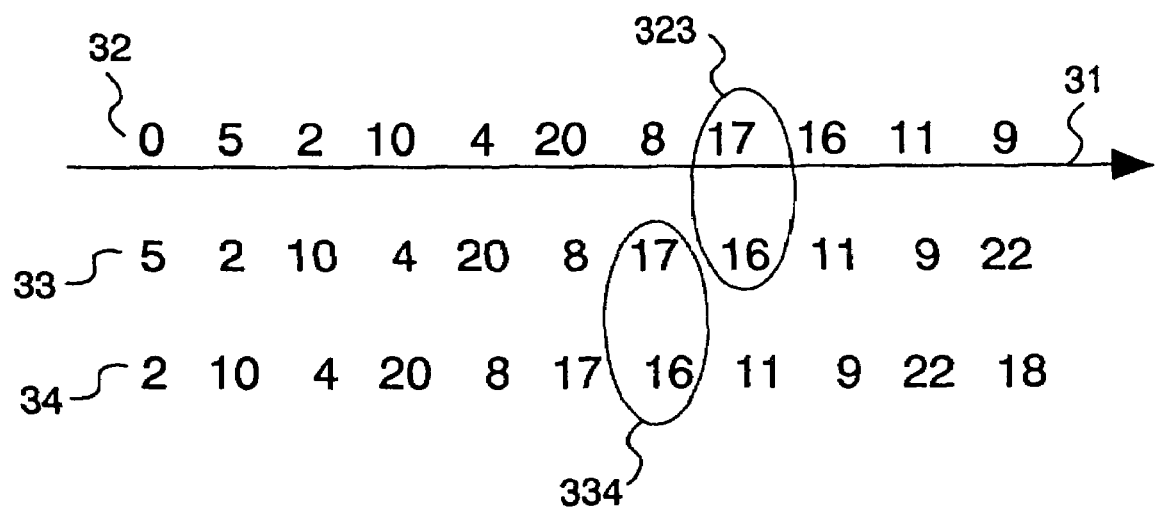
FIG. 4 illustrates subcarrier allocation using Reed-Solomon sequences.

FIG. 4 illustrates an example of subcarrier allocation using Reed-Solomon codes. The method may be used to allocate subcarriers in a multcarrier system such as OFDM, filtered multitone (FMT), discrete multitone (DMT), etc.

Assuming a spectrum of available subcarriers 31 comprising subcarriers number 0, 1, 2, 3, 4, . . . N, the subcarrier allocation first user 32 may be as illustrated. The value points to the allocated carrier within each group of subcarriers and its index is the sub-group numbering.

The subcarrier allocation for a second user 33 may be as illustrated, that is a shifted version of that for the first user 32.

It can be seen that adjacent subcarriers are separated by more than one step difference, except between subcarriers 16 and 17 in zone 323.

Similarly, there is the subcarrier allocation for a third user 34, as illustrated. Again, good separation between subcarriers is achieved, except one step difference in zone 334.

The Reed-Solomon series works on a prime number and generates all the numbers to this prime in a special permutation. The series has the special property that every cyclic permutation of the series gives the same result, and between any to cyclic permutation only 2 numbers are adjunct.

Therefore, if users are allocated carriers with groups of prime numbers, using the Reed-Solomon series for their carrier allocation within each carrier group, two users will have only one adjunct carrier to other users. If a user suffers from a frequency deviation, then only one subcarrier of all users is damaged, and an error correction code (ECC) scheme can handle it.

The next series is a Reed-Solomon series from the prime number of 23 : 0,5,2,10,4,20,8,17,16,11,9,22,18,21,13,19,3, 15,6,7,12,14,1

After two cyclic permutations we get: 2,10,4,20,8,17,16, 11,9,22,18,21,13,19,3,15,6,7,12,14,1,0,5

For this cyclic permutation we see that for a group were the 22 carrier is allocated to one user another users will be allocated the 21 carrier, and only those two will be adjunct for all the carrier allocations.

The carrier allocations are done with groups of carriers containing the amount of prime number carriers. This scheme of allocation can mitigate the effect of one frequency deviated user (it may also be mobile), and therefore we may consider less modes of operation, and a simplified system.

Another advantage for this carrier allocation is derived from the frequency reuse that could be achieved. By using a different derived basic allocation we can allocate carriers in a different cell that uses the same frequency in such a way that the cross correlation of the allocation will be minimal. Therefore average the interference from that cell, this technique will enable to better deal with Co-Channel Interference (CCI) and help in the frequency reuse.

Subcarriers Allocation Method

An example of subcarrier allocation using RS codes may include:

A. all usable subcarriers are divided into 23 carrier groups, called basic groups. According to implementation, a different number of basic groups may be used.

B. each group contains 23 carriers.

C. a first user is assigned carriers in the above groups, as follows in group No. 1 2 3 4 5 6 7 8 9 10 11 12 . . . Subcarrier No. 0 5 2 10 4 20 8 17 16 11 9 22 . . .

D. a second user is assigned carriers in the above groups, as follows in group No. 1 2 3 4 5 6 7 8 9 10 11 12 . . . Subcarrier No. 5 2 10 4 20 8 17 16 11 9 22 18 . . .

E. a second user is assigned carriers in the above groups, as follows in group No. 1 2 3 4 5 6 7 8 9 10 11 12 . . . Subcarrier No. 2 10 4 20 8 17 16 11 9 22 18 21 . . .

F. subsequent users will be assigned subcarriers according to the same method as illustrated above.

One will recognize that the first user received one permutation of RS code, spread over the various groups of subcarriers.

The second user received the same sequence, shifted one location.

The third user received the sequence shifted two places, etc.

The number of groups and the number of subcarriers in each group may vary, according to the number of subcarriers available.

For example, if more subcarriers are available, they may be further divided into three super-groups. Such a scheme will accomodate 3*23*23 subcarriers.

Figure 7:
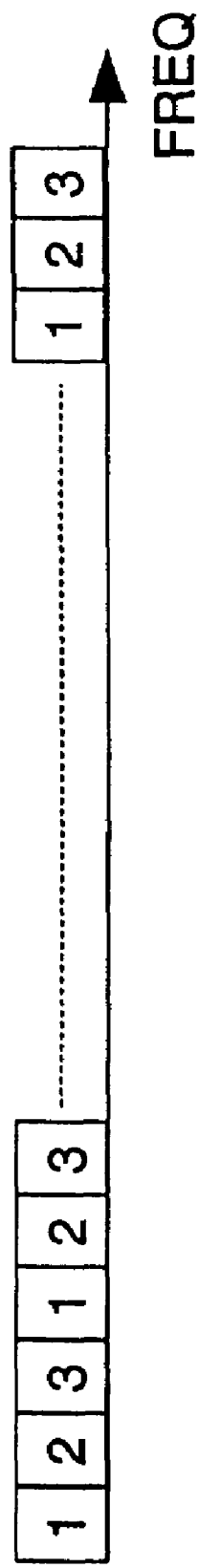
FIG. 7 further illustrates permutations used in subcarriers allocation, based on a Reed-Solomon (R-S) code.

Additional details are presented with reference to FIG. 7.

The above method may be used with the various systems and methods detailed in the present disclosure.

The subcarriers allocation is dynamic, as users enter or leave cells and a controller allocates subcarriers and cancels previous allocations that are no longer in use.

Figure 5:
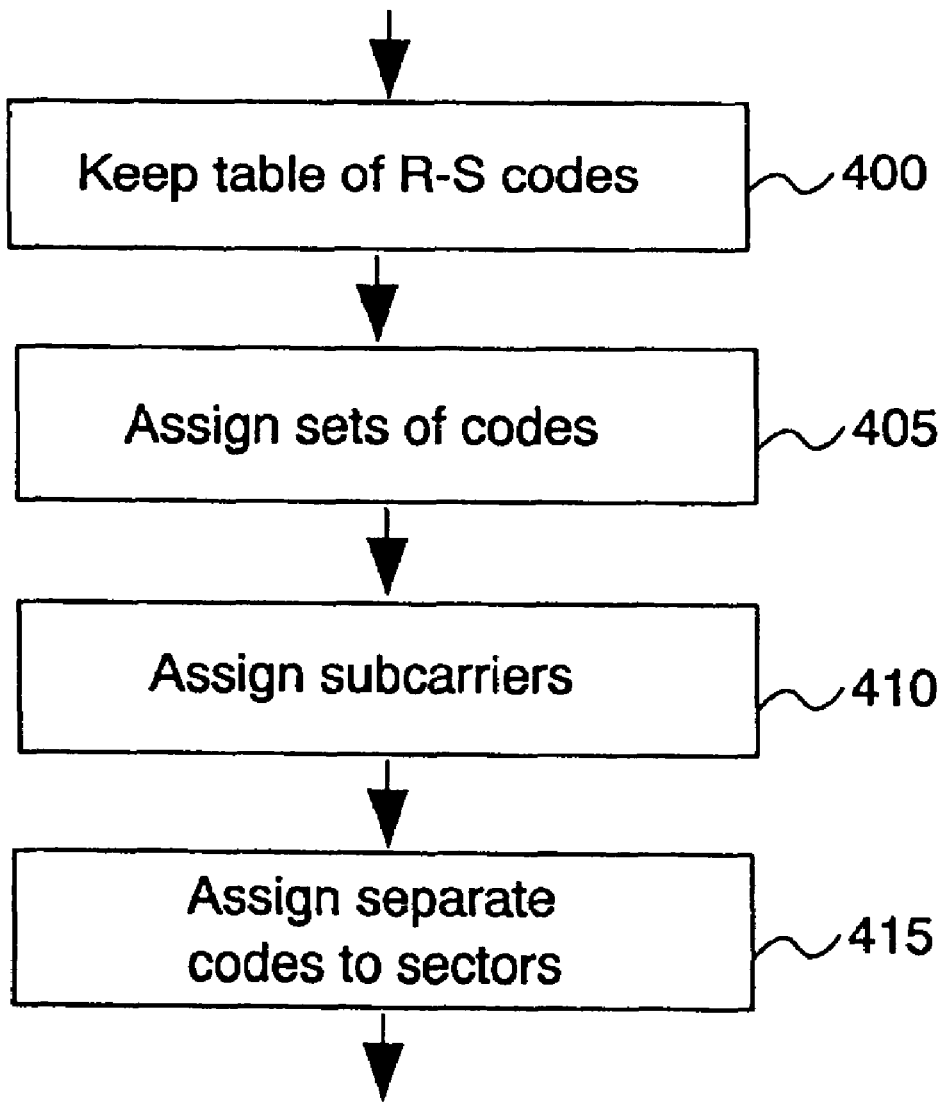
FIG. 5 details a method for subcarriers allocation to users in a cellular system.

FIG. 5 details a method for subcarriers allocation in a cellular system, usable in a cellular system by the network manager, to allocate subcarriers to the various base stations, as follows:

Task 400: keeps a table of R-S codes for frequency group allocation to base stations Task 405: assigns one set of subcarriers based on R-S codes to a base station Task 410: assigns other sets of subcarriers based on R-S codes to other base stations in such a way that adjacent base stations have different R-S codes, to minimize the number of collision points therebetween.

In an OFDM system having N subcarriers available, numbered 0 to N-1, a first base station will be assigned subcarriers Fa, Fb, Fc . . . where a, b, c . . . are members of an R-S code.

For example:

0, 5, 2, 10, 4, 20, 8, 17, 16, 11, 9, 22, 18, 21, 13, 19, 3, 15, 6, where the above numbers refer to the abovedetailed subcarriers 0 to N−1.

An adjacent base station will be assigned a different R-S code, for example:

8, 5, 13, 7, 0, 11, 20, 19, 14, 12, 2, 21, 1

Task 415: where a base station has sectored coverage, a plurality of codes is assigned to that station for use with the various sectors.

End of method.

Figure 6:
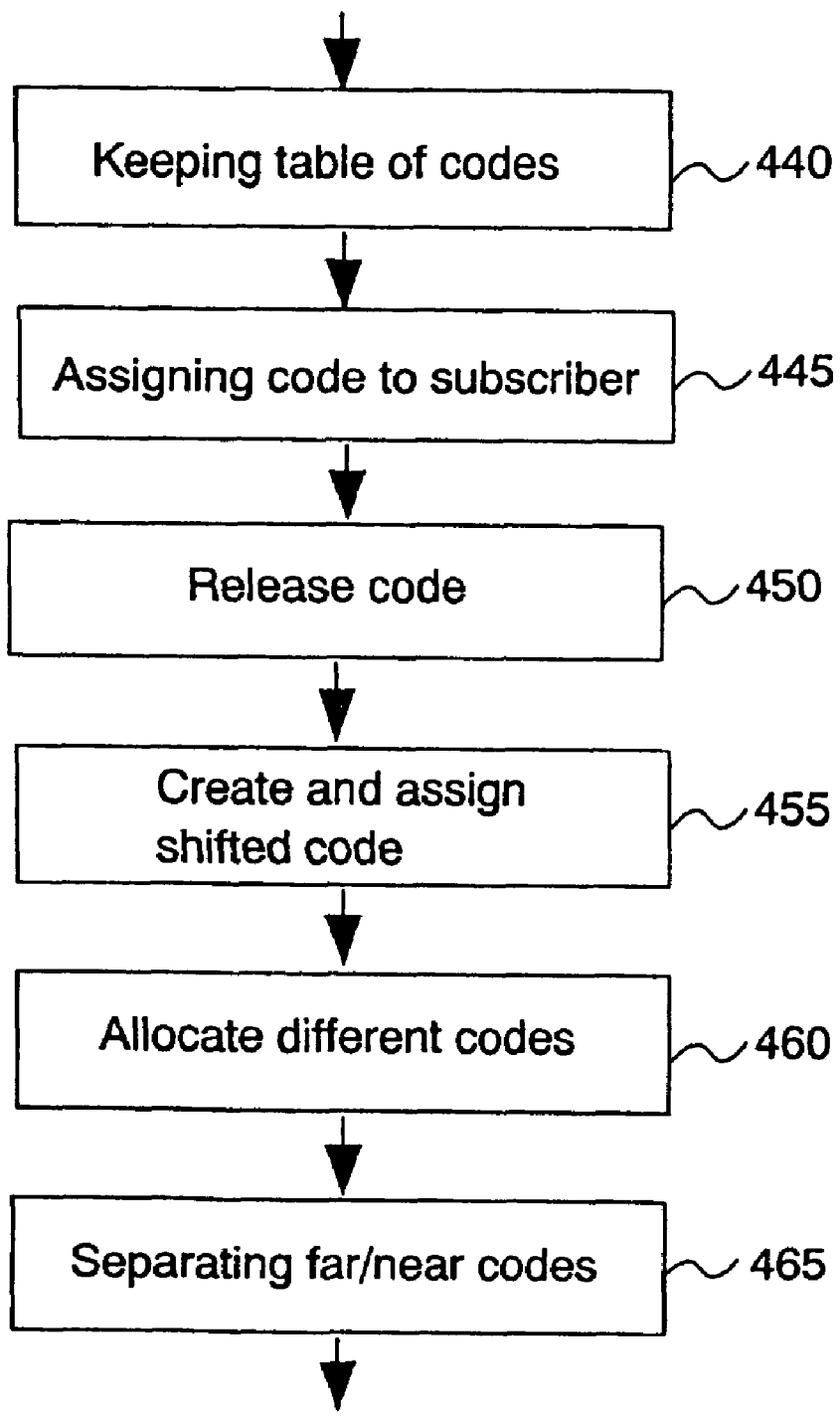
FIG. 6 details another method for subcarriers allocation to users in a cellular system.

FIG. 6 details another method for subcarriers allocation to users in a base station in a cellular system, as follows:

Task 440: base station keeps a table of available codes, wherein part of the codes are tagged "free" whereas the others are "in use"

Task 445: when a new subscriber gains access through a base station, he is assigned one of the codes for that cell.

For example, the code may include the subcarriers numbered:

0, 5, 2, 10, 4, 20, 8, 17, 16, 11, 9, 22, 18, 21, 13, 19, 3, 15, 6, . . .

That code is tagged "in use" or "occupied" in the base station, to prevent its double assignment. Thus, each subscriber in a cell will receive a unique code from the base station.

If several sectors are used, the same code may be assigned to several subscribers, each in a different sector.

Task 450: when a subscriber leaves the cell, his R-S code is tagged as "free".

Task 455: a new subscriber is assigned a shifted version of the code

Task 460: different codes are allocated in various sectors, and taking into account the code of the nearby cell.

Task 465: optional: several codes are allocated to each station for near/far subscribers. Separating far/near subscribers using different codes achieves better separation from adjacent cells.

End of method.

FIG. 7 further illustrates the permutations used in subcarriers allocation. The carriers are based on a Reed-Solomon (R-S) code 23 based, as detailed in FIG. 3 above.

The usable carriers are divided into 23 carrier groups named "basic groups".

Each group contains 23 basic groups.

There are three main groups, as illustrated.

These codes have the maximal distance between shifted versions thereof, and accordingly are advantageously used in the present invention in a multicarrier cellular system to minimize collisions between subcarriers.

There are 23 cyclic rotations, from user to user.

The three main groups are indicated in white, hashed and gray rectangles, respectively. Within each group, Reed-Solomon (R-S) codes are used.

It will be recognized that the foregoing is but one example of an apparatus and method within the scope of the present invention and that various modifications will occur to those skilled in the art upon reading the disclosure set forth hereinbefore.

What is claimed is:

1. A system for allocating subcarriers to subscribers, comprising:
   A. a serial to parallel converter for the serial transmit data;
   B. a subcarrier modulation unit connected to said converter;
   C. a subcarriers allocation controller connected to the modulation unit;
   D. a multicarrier modulation unit; and
   E. a parallel to serial converter, which generates the transmit data out (serial) and wherein the subcarriers allocation controller allocates subcarriers using a Reed-Solomon (R-S) codes scheme.

2. The system for allocating subcarriers to subscribers according to claim 1, wherein the subcarriers allocation controller allocates subcarriers using, for each subscriber, a shifted version of a Reed-Solomon (R-S) code.

3. The system for allocating subcarriers to subscribers according to claim 1, wherein the subcarriers allocation controller allocates subcarriers using, for adjacent subscribers, a shifted version of a Reed-Solomon (R-S) code that are separated by more than one step difference.

4. The system for allocating subcarriers to subscribers according to claim 1, using a group of 22 carriers is allocated to one user, another user will be allocated a cycled version of the group.

5. In a multicarrier system, a method for allocating subcarriers to subscribers, comprising the steps of:
   A. keep a table of Reed-Solomon (R-S) codes for frequency group allocation to base stations:
   B. assign one set of subcarriers based on R-S codes to a base station;
   C. assign other sets of subcarriers based on R-S codes to other base stations in such a way that adjacent base stations have different R-S codes, to minimize the number of collision points therebetween.

6. The method for allocating subcarriers to subscribers according to claim 5, wherein in the multicarrier system having N subcarriers available, number 0 to N-1, a first base station will be assigned subcarriers Fa, Fb, Fc . . . wherein a, b, c . . . are members of an R-S code.

7. The method for allocating subcarriers to subscribers according to claim 5, further including the step of:
   D. where a base station has sectored coverage, a plurality of codes are assigned to that station for use with the various sectors.

8. The method for allocating subcarriers to subscribers according to claim 5, further including the steps of:
   E. base station keeps a table of available codes, wherein part of the codes are tagged "free" whereas the others are "in use";
   F. when a new subscriber gains access through a base station, the subscriber is assigned one or more of the codes for that call;
   G. when a subscriber leaves the cell, his R-S code is tagged as "free";
   H. a new subscriber is assigned a shifted version of the code;
   I. different codes are allocated in various sectors, and taking into account the code of the nearby cell.

9. The method for allocating subcarriers to subscribers according to claim 8, further including the step of allocating several codes to each station for near/far subscribers, and separating far/near subscribers using different codes.

10. The method for allocating subcarriers to subscribers according to claim 8, further including the step of allocating several codes to each of several adjacent users within one cell, to decrease the interference resulting from Doppler, phase noise or collisions with other subscribers.

11. The method for allocating subcarriers to subscribers according to claim 8, wherein the code includes the subcarriers numbered: 0, 5, 2, 10, 4, 20, 8, 17, 16, 11, 9, 22, 18, 21, 13, 19, 3, 15, 6.

* * * * *